United States Patent

Kashima et al.

Patent Number: 5,191,473
Date of Patent: Mar. 2, 1993

[54] OBJECTIVES

[75] Inventors: Shingo Kashima; Chikara Nagano, both of Tokyo, Japan

[73] Assignee: Olympus Optical Co., Ltd., Tokyo, Japan

[21] Appl. No.: 781,846

[22] Filed: Oct. 24, 1991

[30] Foreign Application Priority Data

Oct. 24, 1990 [JP] Japan .................................. 2-286548

[51] Int. Cl.$^5$ .............................................. G02B 21/02
[52] U.S. Cl. .................................. 359/659; 359/658; 359/756; 359/763
[58] Field of Search ........ 359/642, 714, 754, 767–769, 359/656–659, 756, 796, 797, 362, 763

[56] References Cited

U.S. PATENT DOCUMENTS 3,744,881  7/1973  Taira ..................................... 359/659
3,925,910 12/1975  Matsubara ........................... 359/658
4,676,606  6/1987  Takahashi ............................ 359/754

FOREIGN PATENT DOCUMENTS 61-275810 12/1986 Japan .

Primary Examiner—Bruce Y. Arnold
Assistant Examiner—James Phan
Attorney, Agent, or Firm—Cushman, Darby & Cushman

[57] ABSTRACT

An objective of some 10 magnifications usable with microscopes, etc. which has an increased numerical aperture and working distance, including a first lens component that is a cemented lens consisting of negative and positive lens elements, a second lens component a third lens component, a fourth lens component consisting of a cemented lens and a fifth lens component having a positive refractive power, characterized by satisfying the following conditions:

$$\nu_{l2} - \nu_{l1} > 20 \quad (1)$$

$$n_{l1} - n_{l2} > 0.2 \quad (2)$$

wherein:
$n_{l1}$ is the refractive index of d-line of the negative lens element of the first component,
$\nu_{l1}$ is the Abbe's number of said negative lens element of the first lens component,
$n_{l2}$ is the refractive index for d-line of the positive lens element of the first lens component, and
$\nu_{l2}$ is the Abbe's number of said positive lens element of the first lens component.

9 Claims, 4 Drawing Sheets

OBJECTIVES

BACKGROUND OF THE INVENTION

The present invention relates to an objective of some 10 magnifications used with microscopes, etc.

A microscopic objective similar in construction to that of this invention is set forth in JP-A-61(1986)-275810, but the number of its lens elements is as many as 9-10, posing a cost problem.

SUMMARY OF THE INVENTION

Having been accomplished with the foregoing in mind, the present invention seeks to provide an objective for microscopes, etc., which has an increased numerical aperture (NA) and working distance (WD) although smaller in the number of the lenses used, and which has been well corrected for various aberrations.

More specifically, this invention provides an objective made up of, in order from the object side, a first lens component that is a cemented lens consisting of negative and positive lens elements, a second lens component having a positive refractive power in its entirety, a third lens component that is a cemented lens consisting of positive and negative lens elements, a fourth lens component that is a cemented lens consisting of negative and positive lens elements and a fifth lens component having a positive refractive power, satisfying the following conditions:

$$\nu_{f2} - \nu_{f1} > 20 \tag{1}$$

$$n_{f1} - n_{f2} > 0.2 \tag{2}$$

wherein:
$n_{f1}$ is the refractive index for d-line of the negative lens element of the first lens component,
$\nu_{f1}$ is the Abbe's number of said negative lens element of the first lens component,
$n_{f2}$ is the refractive index for d-line of the positive lens element of the first lens component, and
$\nu_{f2}$ is the Abbe's number of said positive lens element of the first lens component.

In this case, the following additional condition should preferably be satisfied.

$$0.75 < f_2/f < 1.25 \tag{3}$$

wherein f is the focal length of the overall objective system, and $f_2$ is the focal length of the second lens component.

More preferably, the following condition should be met as well.

$$2 < |f_3/f_4| < 10 \tag{4}$$

wherein $f_3$ and $f_4$ are the focal lengths of the 3rd and 4th lens components, respectively.

Even more specifically, it is desired that the 3rd lens component be concave on the image side and the 4th lens component be concave on the object side, both said concave surfaces facing each other, and that the first lens component be a cemented positive lens convex on the image side.

According to this invention, the objective may be made up of, in order from the object side, a first lens that is a cemented meniscus lens concave on the object side, two positive lenses, a pair of cemented meniscus lenses with the concave surfaces facing each other, and a positive lens.

Alternatively, the objective may be made up of, in order from the object side, a first lens that is a cemented lens convex on the image side, a positive lens, a pair of cemented meniscus lenses with the concave surfaces facing each other, and a positive lens.

In either case, it is desired that the first lens satisfy the following conditions:

$$\nu_{f2} - \nu_{f1} > 20 \tag{1}$$

$$n_{f1} - n_{f2} > 0.2 \tag{2}$$

wherein:
$n_{f1}$ is the refractive index for d-line of the negative lens element of the first lens component,
$\nu_{f1}$ is the Abbe's number of said negative lens element of the first lens component,
$n_{f2}$ is the refractive index for d-line of the positive lens element of the first lens component, and
$\nu_{f2}$ is the Abbe's number of said positive lens element of the first lens component.

When the objective of a microscope or the like has an increased working distance, there is considerable chromatic aberration; intensive chromatic correction must be effected through the front group. For this reason, it is required that the first lens component be constructed by cementing together negative and positive lens elements, between which there are large differences in terms of both the Abbe's number and refractive index, and that in order to make the most use of its effect, it is satisfying the following conditions:

$$\nu_{f2} - \nu_{f1} > 20 \tag{1}$$

$$n_{f1} - n_{f2} > 0.2 \tag{2}$$

A failure in satisfying Conditions (1) and (2) renders it impossible to correct chromatic aberration occurring through the rear group by the front group, resulting in chromatic correction being undercorrected.

As an increase in the working distance gives rise to an increase in the outer diameter of the front lens group, the luminous flux must be converged by the positive refractive power of the second component. However, since the ray passing through the positive lens increases in height, there is a positive Petzval's sum. In order to achieve an efficient convergence of ray and reduce the resulting positive Petzval's sum as much as possible, it is desired that the following condition be satisfied.

$$0.75 < f_2/f < 1.25 \tag{3}$$

wherein f is the focal length of the entire objective system and $f_2$ is the focal length of the second lens component. At less than the lower limit—0.75—of Condition (3), the positive refractive power of the second lens component becomes too strong, bringing about a positive Petzval's sum so increased that difficulty is encountered in compensating for it by other group including a double-Gauss layout. At more than the upper limit of 1.25, on the other hand, the converging force of the second component is so feeble that the lens diameter of the rear group increases in size, thus making it impossible to effectively guide the ray to the double-Gauss of the rear group.

In order to correct the positive Petzval's sum occurring through the second lens component, etc. and reduce the Petzval's sum as a whole, it is required to guide the ray to the so-called double-Gausses, thereby producing a negative Petzval's sum with their strong negative refractive powers. In this case, coma aberrations have also been corrected. But in order to achieve optimum correction of these, it is desired that the following condition (4) be satisfied.

$$2 < |f_3/f_4| < 10 \quad (4)$$

wherein $f_3$ and $f_4$ are the focal lengths of the 3rd and 4th lens components, respectively. At less than the lower limit of 2 the negative power of the 3rd lens component is so strong that the resulting coma aberrations cannot be corrected well, whereas at more than the upper limit of 10 the negative power of the 3rd lens component is too feeble to correct the Petzval's sum well enough.

Still other objects and advantages of the invention will in part be obvious and will in part apparent form the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
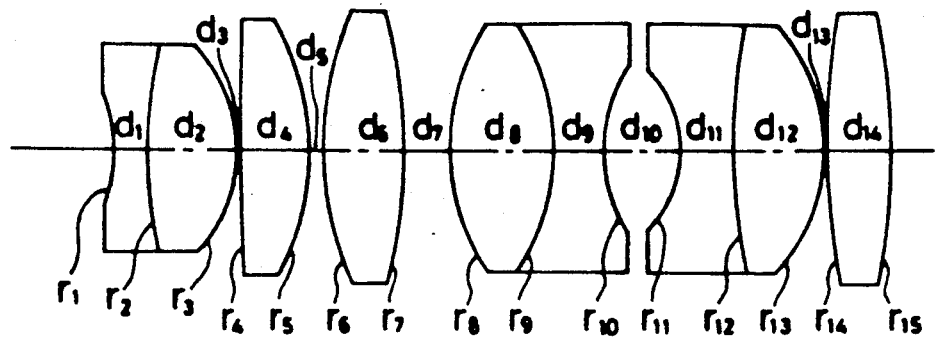
FIGS. 1 to 3 are sectional views of Examples 1 to 3 of the objective according to this invention.
Figure 2:
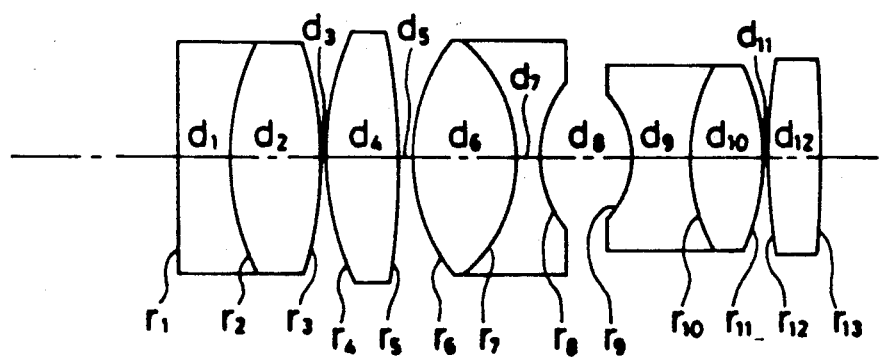
Figure 3:
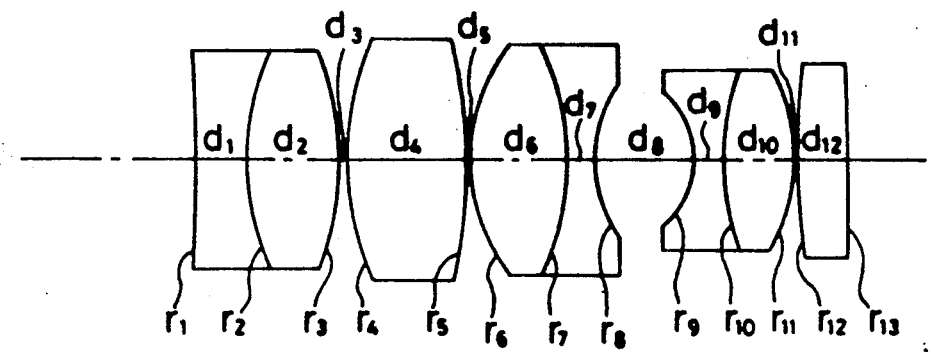

The objective of this invention will now be explained at great length, but not exclusively, with reference to Examples 1 to 3 shown in section in FIGS. 1 to 3. Example 1 is directed to an objective with the 2nd lens component consisting of two positive lenses, which is of 10 magnifications and has an NA of 0.45 and a WD of 3 mm. Example 2 is directed to an objective with the 2nd lens component consisting of one positive lens, which is again of 10 magnifications and has an NA of 0.3 and a WD of 11 mm. Each of Examples 1 and 2 is a so-called compensation type designed to compensate for the chromatic aberration of magnification occurring there by that of the associated eyepiece. Example 3 is directed to an objective with the 2nd lens component consisting of one positive lens, which is once again of 10 magnifications and has an NA of 0.3 and a WD of 10 mm, and this is a so-called compensation-free type designed to correct the chromatic aberration of magnification by itself. The numerical data of the respective examples are set out below; however, it is noted that other symbols or abbreviations represent: M ... the magnification, ω ... the half-field angle, $r_1$, $r_2$, ... the radii of curvature of the respective lens surfaces, $d_1$, $d_2$, ... the surface separation between the adjacent lens surfaces, $n_{d1}$, $n_{d2}$, ... the refractive indices for d-line of the respective lenses, and $\nu_{d1}$, $\nu_{d2}$, ... the Abbe's numbers of the respective lenses.

Example 1 f = 16.75
M = 10
NA = 0.45
ω = 38.35°
WD = 3(mm)

-continued

Example 1

| | | | |
|---|---|---|---|
| $r_1 = -7.350$ | $d_1 = 1.76$ | $n_{d1} = 1.652$ | $\nu_{d1} = 58.5$ |
| $r_2 = 22.517$ | $d_2 = 5.14$ | $n_{d2} = 1.439$ | $\nu_{d2} = 95.0$ |
| $r_3 = -7.930$ | $d_3 = 0.17$ | | |
| $r_4 = 912.162$ | $d_4 = 3.88$ | $n_{d3} = 1.439$ | $\nu_{d3} = 95.0$ |
| $r_5 = -13.747$ | $d_5 = 0.78$ | | |
| $r_6 = 17.018$ | $d_6 = 4.78$ | $n_{d4} = 1.439$ | $\nu_{d4} = 95.0$ |
| $r_7 = -23.794$ | $d_7 = 2.52$ | | |
| $r_8 = 11.227$ | $d_8 = 5.99$ | $n_{d5} = 1.439$ | $\nu_{d5} = 95.0$ |
| $r_9 = -11.334$ | $d_9 = 2.84$ | $n_{d6} = 1.498$ | $\nu_{d6} = 66.8$ |
| $r_{10} = 7.201$ | $d_{10} = 4.50$ | | |
| $r_{11} = -6.281$ | $d_{11} = 3.00$ | $n_{d7} = 1.676$ | $\nu_{d7} = 37.5$ |
| $r_{12} = 40.370$ | $d_{12} = 4.95$ | $n_{d8} = 1.439$ | $\nu_{d8} = 95.0$ |
| $r_{13} = -9.606$ | $d_{13} = 0.15$ | | |
| $r_{14} = 54.235$ | $d_{14} = 3.63$ | $n_{d9} = 1.639$ | $\nu_{d9} = 55.4$ |
| $r_{15} = -30.280$ | | | |
| $f_2/f = 0.83$ | | | |
| $f_3/f_4 = 2.27$ | | | |

Example 2 f = 16.00
M = 10
NA = 0.3
ω = 39.63°
WD = 11(mm)

| | | | |
|---|---|---|---|
| $r_1 = -360.232$ | $d_1 = 2.82$ | $n_{d1} = 1.743$ | $\nu_{d1} = 49.3$ |
| $r_2 = 12.545$ | $d_2 = 5.23$ | $n_{d2} = 1.497$ | $\nu_{d2} = 81.6$ |
| $r_3 = -15.281$ | $d_3 = 0.37$ | | |
| $r_4 = 14.718$ | $d_4 = 4.24$ | $n_{d3} = 1.569$ | $\nu_{d3} = 71.3$ |
| $r_5 = -36.859$ | $d_5 = 0.78$ | | |
| $r_6 = 9.683$ | $d_6 = 5.83$ | $n_{d4} = 1.497$ | $\nu_{d4} = 81.6$ |
| $r_7 = -8.021$ | $d_7 = 1.50$ | $n_{d5} = 1.498$ | $\nu_{d5} = 66.8$ |
| $r_8 = 6.556$ | $d_8 = 5.26$ | | |
| $r_9 = -5.251$ | $d_9 = 3.00$ | $n_{d6} = 1.549$ | $\nu_{d6} = 45.6$ |
| $r_{10} = 10.446$ | $d_{10} = 4.10$ | $n_{d7} = 1.497$ | $\nu_{d7} = 81.6$ |
| $r_{11} = -11.158$ | $d_{11} = 0.15$ | | |
| $r_{12} = 34.676$ | $d_{12} = 2.95$ | $n_{d8} = 1.497$ | $\nu_{d8} = 81.6$ |
| $r_{13} = -59.296$ | | | |
| $f_2/f = 1.19$ | | | |
| $f_3/f_4 = 7.75$ | | | |

Example 3 f = 15.71
M = 10
NA = 0.3
ω = 40.15°
WD = 10(mm)

| | | | |
|---|---|---|---|
| $r_1 = -103.185$ | $d_1 = 3.00$ | $n_{d1} = 1.749$ | $\nu_{d1} = 35.3$ |
| $r_2 = 12.279$ | $d_2 = 5.29$ | $n_{d2} = 1.497$ | $\nu_{d2} = 81.6$ |
| $r_3 = -15.107$ | $d_3 = 0.55$ | | |
| $r_4 = 15.296$ | $d_4 = 6.76$ | $n_{d3} = 1.569$ | $\nu_{d3} = 71.3$ |
| $r_5 = -29.392$ | $d_5 = 0.15$ | | |
| $r_6 = 9.768$ | $d_6 = 5.80$ | $n_{d4} = 1.497$ | $\nu_{d4} = 81.6$ |
| $r_7 = -12.158$ | $d_7 = 1.50$ | $n_{d5} = 1.508$ | $\nu_{d5} = 60.8$ |
| $r_8 = 6.820$ | $d_8 = 5.56$ | | |
| $r_9 = -5.282$ | $d_9 = 1.50$ | $n_{d6} = 1.527$ | $\nu_{d6} = 51.1$ |
| $r_{10} = 11.917$ | $d_{10} = 4.15$ | $n_{d7} = 1.497$ | $\nu_{d7} = 81.6$ |
| $r_{11} = -9.877$ | $d_{11} = 0.15$ | | |
| $r_{12} = 64.411$ | $d_{12} = 2.74$ | $n_{d8} = 1.850$ | $\nu_{d8} = 32.3$ |
| $r_{13} = -130.308$ | | | |
| $f_2/f = 1.19$ | | | |
| $f_3/f_4 = 5.47$ | | | |

Figure 4:
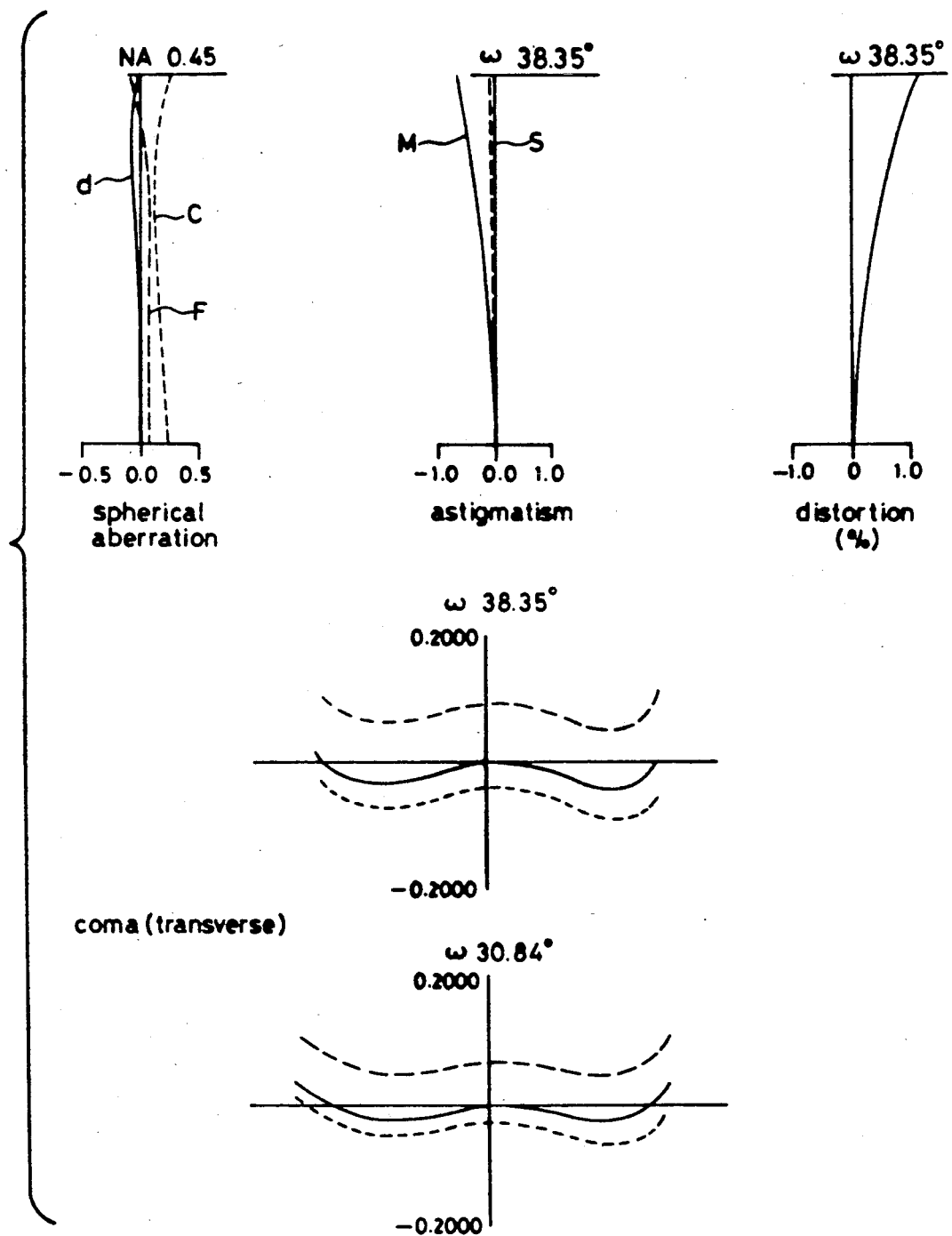
FIGS. 4 to 6 are aberrational diagrams of Examples 1 to 3.
Figure 5:
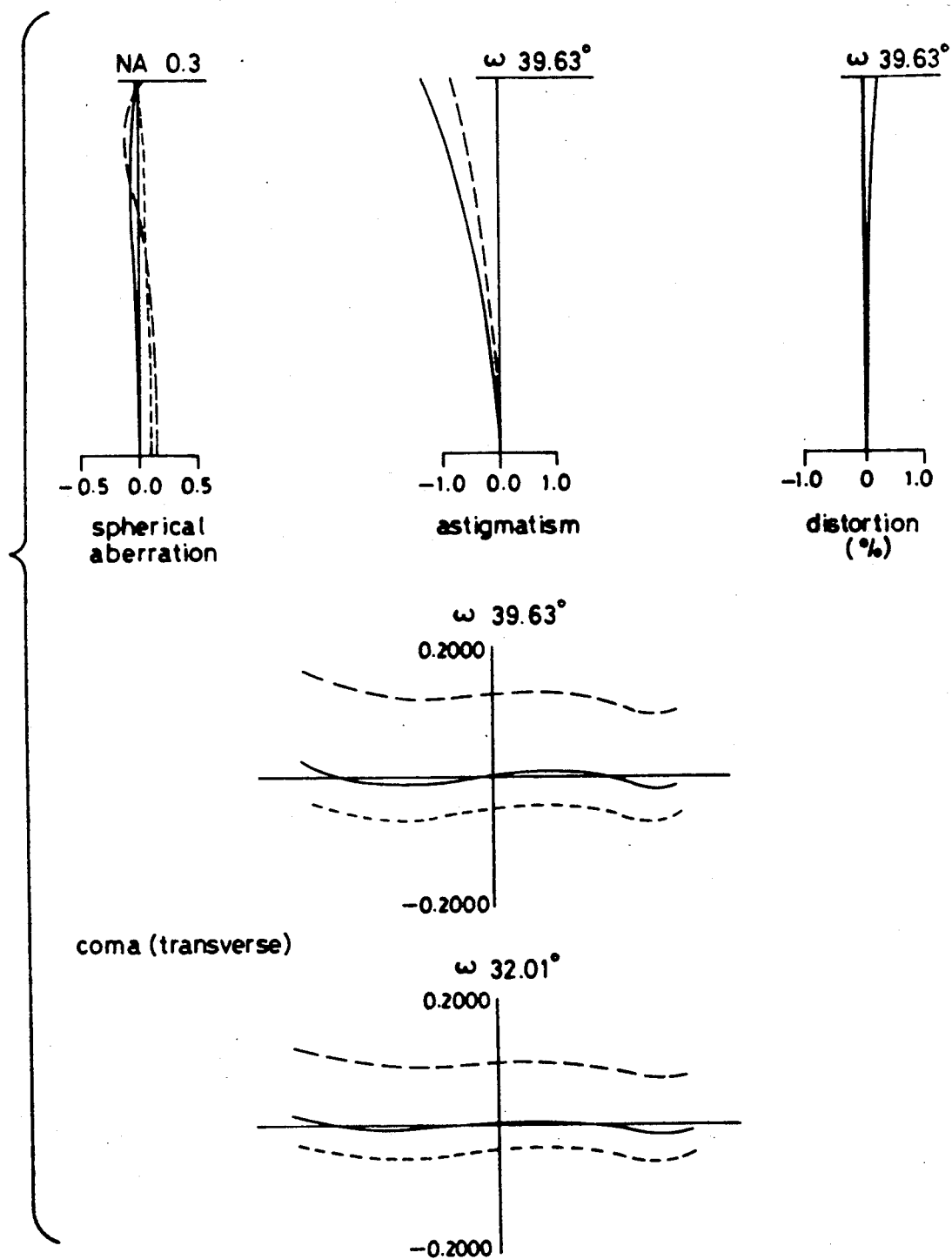
Figure 6:
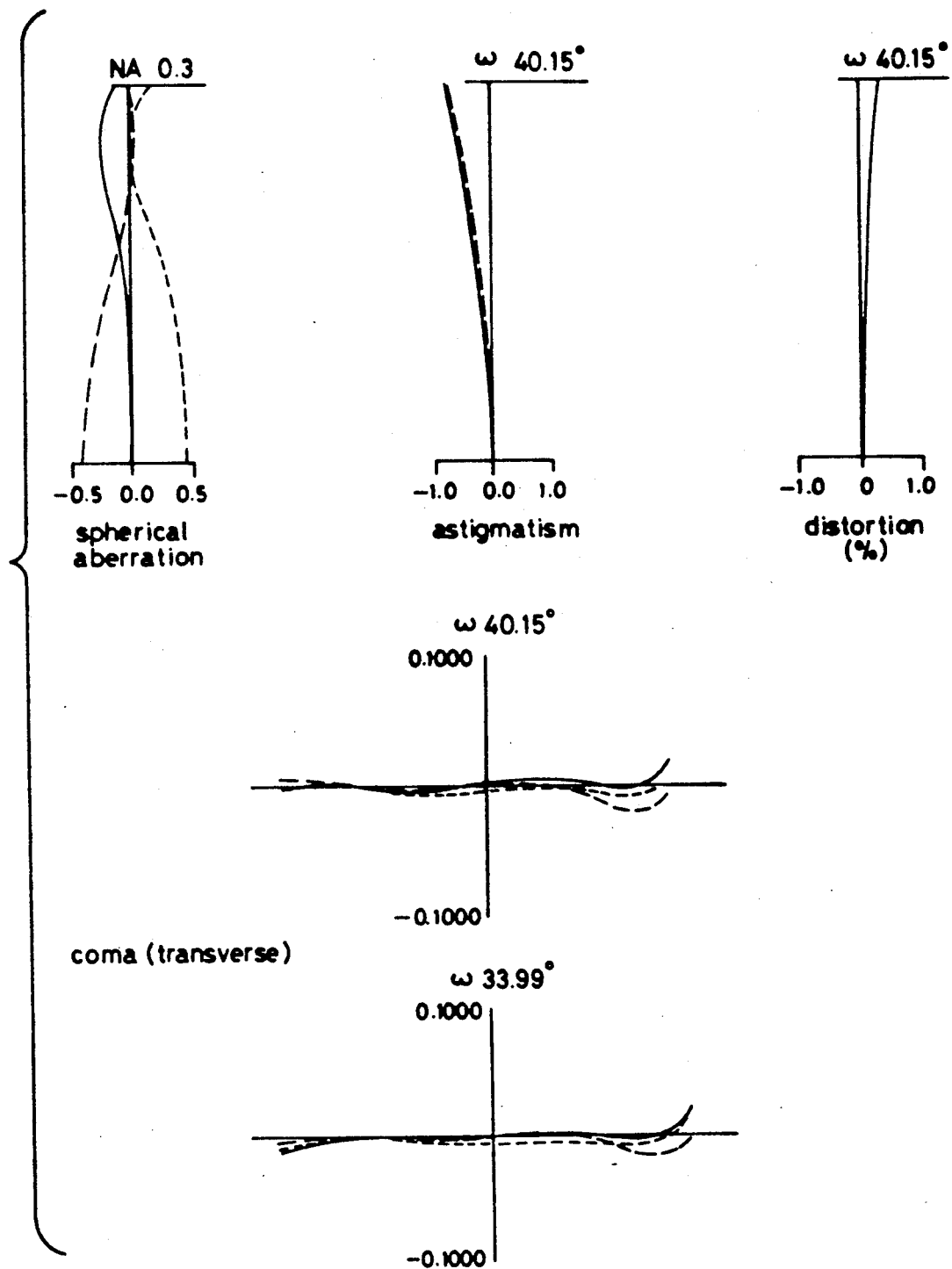

Aberrational diagrams of Examples 1 to 3 are shown in FIGS. 4 to 6.

According to the invention as stated above, it is possible to obtain an objective, e.g. for microscopes, which has an increased NA and WD, although relatively smaller in the number of the lenses used, say, 8-9, and has been well corrected for various aberrations.

What is claimed is:

1. An objective lens system comprising, in order from the object side, a first lens component that is a cemented lens consisting of negative and positive lens elements, a second lens component having a positive refractive power in its entirety, a third lens component that is a cemented lens consisting of positive and negative lens elements, a fourth lens component that is a cemented lens consisting of negative and positive lens elements and a fifth lens component having a positive refractive power, and satisfying the following conditions:

$$\nu_{f2} - \nu_{f1} > 20 \quad (1)$$

$$n_{f1} - n_{f2} > 0.2 \quad (2)$$

wherein:
$n_{f1}$ is the refractive index for d-line of the negative lens element of the first lens component,
$\nu_{f1}$ is the Abbe's number of said negative lens element of the first lens component,
$n_{f2}$ is the refractive index for d-line of the positive lens element of the first lens component, and
$\nu_{f2}$ is the Abbe's number of said positive lens element of the first lens component.

2. An objective as claimed in claim 1, further satisfying the following condition:

$$0.75 < f_2/f < 1.25 \quad (3)$$

wherein f is the focal length of the entire objective system and $f_2$ is the focal length of the second lens component.

3. An objective as claimed in claim 2, further satisfying the following condition:

$$2 < |f_3/f_4| < 10 \quad (4)$$

wherein $f_3$ and $f_4$ are the focal lengths of the 3rd and 4th lens components, respectively.

4. An objective as claimed in claim 3, wherein the third lens component has a face concave on the image side and the fourth lens component has a face concave on the object side, both said concave faces facing each other.

5. An objective as claimed in claim 3, wherein the first lens component is a cemented positive lens convex on the image side.

6. An objective including, in order from the object side, a first lens that is a cemented meniscus lens concave on the object side, two positive lenses, a pair of cemented meniscus lenses with the concave surfaces facing each other, and a positive lens.

7. An objective as claimed in claim 6, characterized in that the first lens satisfies the following conditions:

$$\nu_{f2} - \nu_{f1} > 20 \quad (1)$$

$$n_{f1} - n_{f2} > 0.2 \quad (2)$$

wherein:
$n_{f1}$ is the refractive index for d-line of a negative lens element of the first lens component,
$\nu_{f1}$ is the Abbe's number of said negative lens element of the first lens component,
$n_{f2}$ is the refractive index for d-line of a positive lens element of the first lens component, and
$\nu_{f2}$ is the Abbe's number of said positive lens element of the first lens component.

8. An objective including, in order from the object side, a first lens that is a cemented lens convex on the image side, a positive lens, a pair of cemented meniscus lenses with concave surfaces facing each other, and a positive lens; and
the first lens satisfies the following conditions (1) and (2):

$$\nu_{f2} - \nu_{f1} > 20 \quad (1)$$

$$n_{f1} - n_{f2} > 0.2 \quad (2)$$

wherein:
$n_{f1}$ is the refractive index for the d-line of a negative lens element of the first lens.
$\nu_{f1}$ is the Abbe's number of said negative lens element of the first lens,
$n_{f2}$ is the refractive index for the d-line of a positive lens element of the first lens,
$\nu_{f2}$ is the Abbe's number of said positive lens element of the first lens.

9. An objective consisting of, in order from the object side, a first lens that is a cemented lens convex on the image side, a positive lens, a pair of cemented meniscus lenses with concave surfaces facing each other, and a positive lens.

* * * * *